United States Patent
Omae et al.

(10) Patent No.: US 6,367,131 B1
(45) Date of Patent: Apr. 9, 2002

(54) METHOD FOR PRODUCING GRID FOR A LEAD STORAGE BATTERY

(75) Inventors: Takao Omae; Shigeharu Osumi; Kenji Yamanaka; Masahiko Kosai, all of Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/615,734

(22) Filed: Jul. 13, 2000

(51) Int. Cl.$^7$ .............................. H01M 4/82; H01M 4/84
(52) U.S. Cl. ............................. 29/2; 429/242; 429/245
(58) Field of Search .................................. 29/2; 429/241, 429/242, 245

(56) References Cited

U.S. PATENT DOCUMENTS 4,109,358 A  *  8/1978  Duddy et al. .................... 29/2
4,125,690 A  * 11/1978  Bagshaw et al. ............. 420/565

FOREIGN PATENT DOCUMENTS

JP          05 290855     * 11/1993 ............ H01M/4/74

OTHER PUBLICATIONS

Prengaman, J. Power Sources, 67 (1997) 267–278.*

* cited by examiner

Primary Examiner—Carol Chaney
(74) Attorney, Agent, or Firm—Sughrue Mion, PLLC

(57) ABSTRACT

A method for producing a grid for a lead storage battery has a first step, a second step and a cooling step performed between the first and second step. In the first step, lead alloy is sequentially rolled over a plurality of rolls. In the second step, the rolled sheet obtained at the first step is machined to produce a grid for a lead storage battery. In the cooling step, the rolled sheet is cooled so that (1) the surface temperature thereof is 10° C. or lower at least once and (2) the total time during which the rolled sheet is exposed to an atmosphere of higher than 10° C. is 10 hours or less.

4 Claims, 2 Drawing Sheets

RELATIONSHIP BETWEEN COOLING RATE AND
TENSILE STRENGTH OF ROLLED SHEET

RELATIONSHIP BETWEEN COOLING RATE AND
TENSILE STRENGTH OF ROLLED SHEET

RELATIONSHIP BETWEEN COOLING RETENTION TIME
OF ROLLED SHEET AND NUMBER OF BREAKS ON FRAME

METHOD FOR PRODUCING GRID FOR A LEAD STORAGE BATTERY

BACKGROUND OF THE INVENTION

1. Field of the Invention

The present invention relates to a grid for a lead storage battery. More particularly, the present invention relates to a method for producing a grid having a high deformation (such as grid growth) resistance in a stable manner regardless of the kind of machining such as expansion and punching.

2. Description of the Related Art

A grid for a lead storage battery is produced mainly by casting method or machining method such as expansion and punching.

Machining allows continuous production of grids and installation of a continuous line including filling with paste and drying, and thus gives an extremely high productivity as compared with casting method. Machining also makes it easy to produce a thin grid designed for higher power or reduced weight and to fill the grid with a paste thereafter.

In accordance with machining, a slab (thick plate material) having a thickness of from 10 mm to 30 mm cast or extruded from a lead-calcium-tin alloy is generally rolled sequentially over a plurality of rolls. The sheet thus rolled is once wound. Thereafter, the rolled sheet is machined while being rewound to produce a grid. The reason why the rolled sheet is not directly fed continuously to machining step such as expansion step and subsequent paste filling step but is wound before being fed to machining step or paste filling step while being rewound is that the production speed of rolling is generally higher than the speed of machining and/or paste filling. Further, it is necessary that the suspension of machining step or paste filling which can be possibly caused by some troubles in the process of production of a rolled sheet be avoided. Moreover, when the place of production of a rolled sheet and the place of production of grid and filling the grid with a paste are remote from each other, they cannot be connected.

The conventional method is disadvantageous in that strain developed during machining causes the recrystallization of alloy to proceed, rendering the electrode plate deformable such as grid growth during use in battery. In other words, the foregoing machining method is disadvantageous in that when machining is effected on the rolled sheet, i.e., a blade having a predetermined shape is pressed against the rolled sheet to cut the rolled sheet, the frames forming the grid and the crossover point of frames have strain left therein, causing the recrystallization thereof to proceed and hence making it easy for the electrode plate to elongate remarkably during use in battery. In particular, when such a machined grid is used as a grid for a positive electrode in a lead storage battery, lead on the surface of the grid is converted to lead dioxide, which has a greater volume that causes the grid to be subject to tensile strength. If the recrystallization of the grid has proceeded, the grid exhibits a deteriorated mechanical strength and thus can undergo elongation and deformation under the application of tensile strength. As the elongation or deformation of the grid increases, the adhesivity between the grid and the active material is deteriorated, causing the drop of capacity.

Further, the rolled sheet which has been allowed stand without any treatment after production is disadvantageous in that hardening due to the progress of aging causes a great deterioration of the elongation, resulting in the increase of occurrence of break during expansion. Thus, rolling conditions and treatment conditions have been studied to improve the mechanical properties of a rolled sheet.

As one of approaches for solving the foregoing problems, there has been studied a process involving the storage of a rolled sheet at low temperatures for the purpose of retarding age hardening during storage. However, it is usual that it takes some time for the rolled sheet which has been introduced into the storage chamber to cool. Thus, the age hardening of the alloy can proceed even in a short period of time between the termination of rolling and the lowering of the temperature, causing a great change in the state of the rolled sheet and hence deteriorating the stability thereof during machining.

Further, when the rolled lead alloy sheet which has been produced is put in water so that it is rapidly cooled, the mechanical properties of the sheet after hardening can be improved. This is because when the alloy is rapidly cooled, the additive elements can not diffuse quickly in state from high solubility to low solubility, producing supersaturation that causes the deposition of fine intermetallic compounds in the alloy during age hardening. However, this approach is disadvantageous in that when water is attached to the surface of the sheet, oxides are produced thereon, resulting in the production of an electrode plate from which the active material can easily come off.

SUMMARY OF THE INVENTION

It is an object of the present invention to provide a method for producing a grid having an excellent life which can reduce the recrystallization due to strain during machining to inhibit the deformation of grid. It is another object of the present invention to improve the mechanical properties of a rolled sheet to be machined by inhibiting the recrystallization due to age hardening.

According to a first aspect of the present invention, a method for producing a grid for a lead storage battery comprises a first step of sequentially rolling lead alloy over a plurality of rolls; a second step of machining the rolled sheet obtained at the first step to produce a grid for a lead storage battery; and between the first step and the second step, a cooling step to cool the rolled sheet so that (1) the surface temperature thereof is 10° C. or lower at least once and (2) the total time during which the rolled sheet is exposed to an atmosphere of higher than 10° C. is 10 hours or less. In this manner, recrystallization due to strain during machining can be minimized, making it possible to inhibit the deformation of the grid.

In a second aspect of the present invention, the cooling step is effected in a gas phase after the termination of the first step of the first aspect of the present invention. In this manner, the rolled sheet can be prevented from undergoing recrystallization due to age hardening before machining without wetting on the surface thereof, making it possible to inhibit break during working.

In a third aspect the present invention, which is a further embodiment of the second aspect of the present invention, the cooling step is effected in such a manner that the surface temperature of the rolled sheet lowers to 10° C. or lower at a rate of 5° C./min or more.

In a fourth aspect of the present invention, the lead alloy is a lead-calcium-tin alloy comprising 0.04% by mass or more, 0.09% by mass or less, 1.0% by mass or more and 2.4% by mass or less, respectively, in the first to third aspects of the present invention.

DETAILED DESCRIPTION OF THE INVENTION

Figure 1:
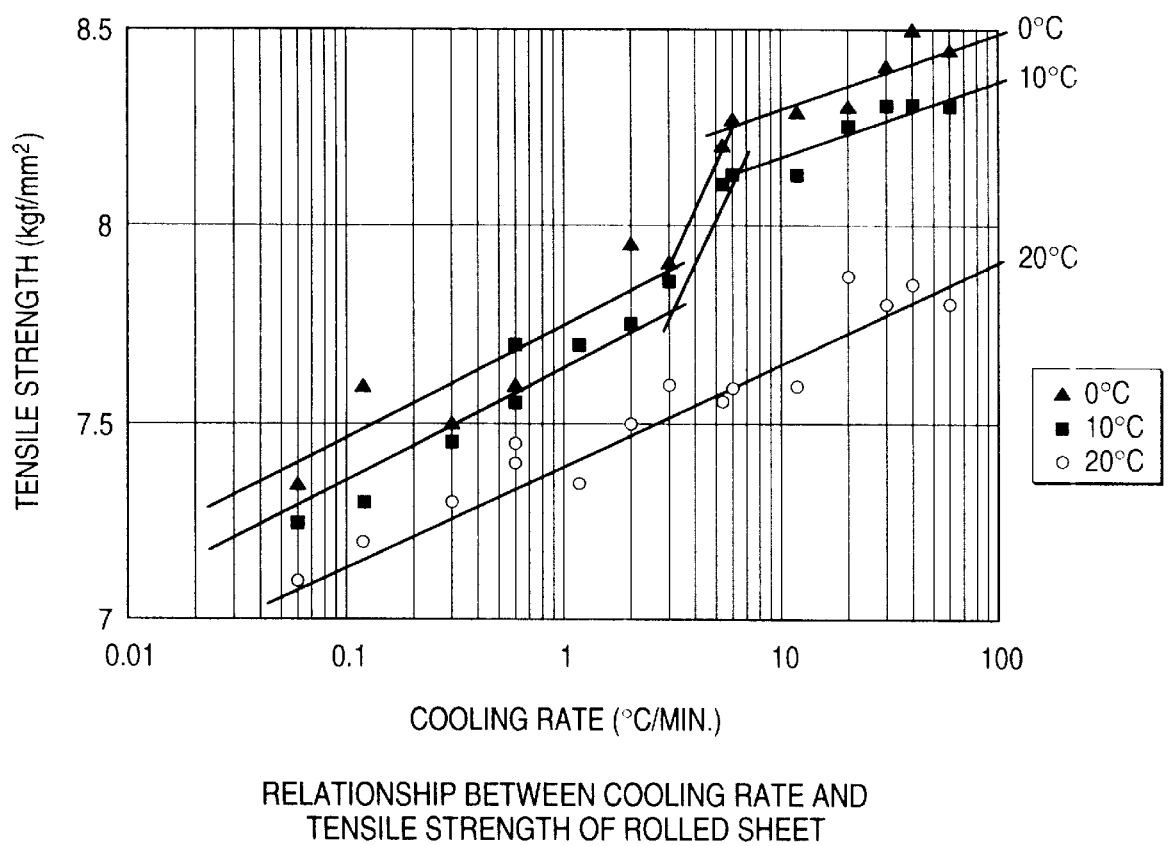
FIG. 1 shows a result of examination in Example 4.

Detailed description of the present invention will be described hereinafter, but the present invention should not be construed as being limited thereto.

An embodiment of a method for producing a grid for a lead storage battery according to the present invention has casting a lead-calcium-tin alloy into a slab, sequentially rolling the slab over a plurality of rolls, winding the rolled sheet, and then machining the rolled sheet while being unwound to produce a grid for a lead storage battery, wherein the sum (a+b) of the time (a) between the termination of winding of the rolled sheet wound and the introduction into an atmosphere of 10° C. or lower and the time (b) between the withdrawal from the atmosphere of 10° C. or lower and the beginning of machining is 10 hours or less. The foregoing rolled sheet preferably is a lead-calcium-tin alloy containing calcium and tin in an amount of from not less than 0.04% by mass to not more than 0.09% by mass and from not less than 1.0% by mass to not more than 2.4% by mass, respectively.

When the storage in the atmosphere of 10° C. or lower and the withdrawal from the storage space are effected plural times (n), the total $(a_1+a_2+ \ldots +a_n+b)$ of the time $(a_1)$ between the termination of winding of the rolled sheet wound and the introduction into the atmosphere of 10° C. or lower, the time $(a_2)$ between the withdrawal from the storage space and the reintroduction into the atmosphere of 10° C. or lower, so forth to the time $(a_n)$ between the withdrawal from the atmosphere of 10° C. or lower and the reintroduction into the atmosphere of 10° C. or lower, and the time (b) between the withdrawal from the atmosphere of 10° C. or lower and the beginning of machining is 10 hours or less.

Further, cooling is effected in a gas phase after the termination of the rolling step, preferably at a rate of 5° C./min or more.

By thus rapidly cooling the alloy which has been rolled, the resulting rolled lead alloy sheet can be provided with an enhanced mechanical strength after hardening. Further, since this cooling doesn't require the use of water, the oxidation of the surface of the sheet can be prevented, enhancing the stability during machining.

It is thought that, in accordance with the producing method of the present invention, strain remaining in the frames forming the grid or inside the crossover point of frames can be relaxed, making it difficult for recrystallization to occur and hence minimizing the elongation or deformation of the grid. It is further thought that cooling makes it possible to improve the mechanical properties of the rolled sheet which has hardened.

EXAMPLE 1

The present invention will be further described in the following examples.

As mentioned above, recrystallization is considered to be a great cause of elongation of grid. The relationship among the time between the termination of rolling and the introduction into the constant temperature chamber, the time between the withdrawal from the constant temperature chamber and the beginning of machining and recrystallization was studied.

A slab having a thickness of 15 nun made of a lead alloy containing 0.06% (hereinafter by mass) of calcium, 1.5% of tin and 0.007% of aluminum was produced. The slab thus produced was then sequentially passed through 7 pairs of rolls to obtain a rolled sheet having a final thickness of 1.1 mm. The rolled sheet was then into a constant temperature chamber which had been adjusted to a temperature of 50° C. immediately or after 2.5 hours, 5 hours, 7.5 hours, 10 hours, 12.5 hours and 15 hours. These sheets were each then withdrawn from the constant temperature chamber 48 hours after the introduction into the constant temperature chamber. These sheets were each then subjected to expansion immediately or 2.5 hours, 5 hours, 7.5 hours, 10 hours, 12.5 hours and 15 hours after withdrawal from the constant temperature chamber to obtain grids. These grids were each then allowed to stand in an 85° C. constant temperature bath for 3 weeks. These grids were each then observed for the conditions of section of crossover point of frames under metallurgical microscope to see how recrystallization proceeds under these conditions.

The temperature to which the rolled sheet is exposed between its production and the introduction into the 5° C. constant temperature chamber and between the withdrawal from the 5° C. constant temperature chamber and expansion was from 20° C. to 35° C. The rolled sheet which had just been produced exhibited a surface temperature of about 60° C. The rolled sheet which had been allowed to stand for 2.5 hours after production exhibited a surface temperature of from about 20° C. to 35° C., which was almost the same as ambient temperature.

The results are set forth in Table 1.

TABLE 1

| | | Time b between withdrawal from 5° C. constant temperature chamber and expansion (Hour) | | | | | | |
|---|---|---|---|---|---|---|---|---|
| | | 0 | 2.5 | 5 | 7.5 | 10 | 12.5 | 15 |
| Time a between production of a rolled sheet and introduction into 5° C. constant temperature chamber (Hour) | 0 | ○ | ○ | ○ | ○ | ○ | ○ | Δ |
| | 2.5 | ○ | ○ | ○ | ○ | ○ | Δ | Δ |
| | 5 | ○ | ○ | ○ | Δ | Δ | Δ | Δ |
| | 7.5 | ○ | ○ | Δ | Δ | Δ | x | x |
| | 10 | ○ | Δ | Δ | Δ | x | x | x |
| | 12.5 | Δ | Δ | Δ | x | x | x | x |
| | 15 | Δ | x | x | x | x | x | x |

The symbols ○, Δ, and x indicate that recrystallization at the crossover point of frames extends over less than ½, from not less than ½ to less than ¾, and not less than ¾ of the sectional area of the crossover point, respectively. As can be seen in Table 1, when the sum of the time (a) between the production of the rolled sheet and the introduction into the constant temperature chamber which has been adjusted to 5° C. and the time (b) between the withdrawal from the constant temperature chamber and expansion is about 10 hours or less, recrystallization extends over only less than ½ of the sectional area of the crossover point of frames under the foregoing test conditions.

This suggests that the grid produced according to the present invention exhibits little elongation and thus is quite able to provide a battery having a long life.

EXAMPLE 2

The rolled sheets which had been produced in the same manner as in Example 1 were introduced into a constant temperature chamber which had been adjusted to 5° C. after 2.5 hours, 5 hours and 7.5 hours (time $a_1$), respectively. 48 hours after introduction, these rolled sheets were each withdrawn from the constant temperature chamber. These rolled sheets were each introduced into the 5° C. constant temperature chamber after 2.5 hours, 5 hours and 7.5 hours (time $a_2$). 24 hours after introduction, these rolled sheets were each withdrawn from the constant temperature chamber. After 2.5 hours, these rolled sheets were each expanded to obtain grids. These expanded grids were each observed under metallurgical microscope in the same manner as in Example 1 to examine the degree of recrystallization.

The results are set forth in Table 2.

TABLE 2

|        |     | $a_2$ (H) |     |     |     |
|--------|-----|-----------|-----|-----|-----|
|        |     | 0         | 2.5 | 5   | 7.5 |
| $a_1$ (H) | 2.5 | ○      | ○   | ○   | Δ   |
|        | 5   | ○         | ○   | Δ   | Δ   |
|        | 7.5 | ○         | Δ   | Δ   | Δ   |

(The data at $a_2$ of 0 hour was excepted from Table 1)

The symbols ○, Δ, and x are as defined in Table 1.

As can be seen in Table 2, when the sum of $a_1$ and $a_2$ is 7.5 hours (since b is 2.5 hours, the sum of $a_1$, $a_2$ and b is 10 hours), recrystallization extends over only less than ½ of the sectional area of the crossover point of frames as in Example 1.

EXAMPLE 3

As representatives of the grids characterized by the symbols ○, Δ, and x in Table 1 there were used Grid Nos. 1, 2 and 3, respectively. These grids were each filled with a positive electrode paste according to an ordinary method, cured, and then dried. These unformed positive electrode plates were each combined with an unformed expanded negative electrode plate enveloped by an ordinary porous polyethylene separator to produce an unformed battery having a 5-hour rate capacity of 35 AH (ampere-hour). Subsequently, these unformed batteries were each charged (formed) according to an ordinary method, repeatedly charged and discharged in a 25° C. water bath three times to stabilize its capacity, and then continuously overcharged at 7 A in a 75° C. water bath. After 6 weeks of overcharging, these batteries were each subjected to 5-hour rate discharging in a 25° C. water bath to confirm capacity. These batteries were each then disassembled after charged. The positive electrode plate was withdrawn, and then measured for dimension.

TABLE 3

| Grid No. | a          | b          |
|----------|------------|------------|
| 1        | 2.5 hours  | 2.5 hours  |
| 2        | 7.5 hours  | 7.5 hours  |
| 3        | 12.5 hours | 12.5 hours |

The measurements of 5-hour rate capacity (relative to the initial value as 100) and the elongation of positive electrode plate after overcharging test are set forth in Table 4.

TABLE 4

| Battery (grid used) | 5-hour rate capacity after overcharging test (relative to initial value as 100) | % Elongation of positive electrode plate after over-charging test | |
|---|---|---|---|
| | | Longitudinal | Crosswise |
| A (1) | 102 | 3 | 1 |
| B (2) | 93  | 5 | 3 |
| C (3) | 81  | 8 | 5 |

As can be seen in Table 4, Battery A showed a far smaller elongation both in the longitudinal direction and crosswise direction after overcharging test than Batteries B and C.

Referring to 5-hour rate capacity after overcharging test, Battery A showed a capacity of higher than the initial value while Batteries B and C showed a value as low as 93% and 81% of the initial value, respectively.

These results show that the expanded grid produced according to the method of the present invention exhibits little elongation and thus can provide a battery having a long life.

Explained is the reason why Battery A had a capacity of higher than the initial value after overcharging test. When the battery was subjected to 3-cycle charge-discharge in the initial stage, the majority of the unformed active positive electrode material was converted to lead dioxide ($PbO_2$), which is an active material. However, since the portion which had been left unconverted to lead dioxide was converted to lead dioxide during overcharging or the surface of the grid was corroded during overcharging to give lead dioxide as a corrosion product, increasing the amount of the active positive electrode material which can be charged (lead dioxide).

While a constant temperature chamber which had been adjusted to 5° C. was used in the foregoing test, the same effect was obtained with a constant temperature chamber which had been adjusted to 10° C. This is presumably because the rolled sheet shows almost the same age hardening behavior from 5° C. to 10° C., and even when allowed to stand at the two temperatures for 1 week, the rolled sheet shows a mechanical strength increase as small as 4% or less, giving almost the same degree of residual stain during expansion from 5° C. to 10° C.

It is not preferred that the constant temperature chamber be adjusted to higher than 10° C. because the higher the temperature is, the more rapidly increases the mechanical strength during the storage in the constant temperature chamber.

In Examples 1 to 3, the temperature to which the rolled sheet is exposed between its production and the introduction into the 5° C. constant temperature chamber and between the withdrawal from the 5° C. constant temperature chamber and expansion was relatively high as from 20° C. to 35° C. When this temperature is low, the sum (a+b) or ($a_1+a_2+ \ldots +a_n+b$) can be greater than 10 hours. However, since there are no troubles in working when it is claimed "this sum is preferably less than 10 hours to cause no troubles at ordinary temperatures", this sum was 10 hours.

Referring to the composition of alloy, when the calcium content falls below 0.04%, the resulting rolled sheet exhibits reduced mechanical strength and thus can hardly be handled during machining or battery assembly and shows an increased elongation during use in battery. On the contrary, when the calcium content exceeds 0.09%, the resulting rolled sheet exhibits a deteriorated corrosion resistance and an increased elongation during use in battery. Accordingly, the calcium content in the lead alloy is preferably from not less than 0.04% to not more than 0.09%.

When the tin content falls below 1.0%, the resulting rolled sheet exhibits a reduced mechanical strength and exhibits an increased elongation during use in battery. On the contrary, when the tin content exceeds 2.4%, tin deposits to inhibit corrosion resistance far from improving corrosion resistance and thus causes the rolled sheet to show an increased elongation. Accordingly, the tin content is preferably from not less than 1.0% to not more than 2.4%. While the rolled sheet was examined in the form of expanded grid, the same effect was obtained in the form of punched grid.

EXAMPLE 4

The influence of cooling method after rolling on the mechanical properties of the rolled sheet during machining was studied in the following manner.

A slab having a thickness of 15 mm made of a lead alloy containing 0.06% of calcium, 1.5% of tin and 0.007% of aluminum was produced by casting. The slab thus produced was then sequentially passed through 7 pairs of rolls to obtain a rolled sheet having a final thickness of 1.1 mm. The width of the rolled sheet was about 100 mm. The slab was then wound to a diameter of about 1.5 m to make one sample.

Subsequently, the rolled sheet was cooled under various conditions, kept cooled for a predetermined period of time, subjected to forced age hardening, and then measured for altimate tensile strength and elongation at break. The conditions will be given below.

Test procedure: rolling ends→cooled→kept cooled→forced to harden→tensile test

Cooling method: air cooling (time between the termination of rolling and the beginning of cooling is 2 hours or less)
Cooling time (until the cooling retention temperature is reached): 1 to 1,000 minutes
Cooling retention temperature: 0° C., 10° C., 20° C.
Cooling retention time: 1 hour
Forced hardening conditions: 60° C.-24 hours When cooling began, the coiled sheet exhibited a surface temperature of about 60° C. The cooling of the rolled sheet was carried out by introducing the rolled sheet into a constant temperature chamber. During this procedure, the change of the surface temperature of the rolled sheet was measured.

The results of test are shown in FIG. 1. FIG. 1 illustrates cooling rate on the abscissa and tensile strength on the ordinate. Since the cooling time is the time during which the temperature changes from that at the termination of rolling to the cooling retention temperature, the cooling rate can be represented by the following equation:

Cooling rate (° C./min)=Temperature change/cooling time

In the case where the cooling retention temperature was 0° C. or 10° C., the tensile strength was enhanced when the cooling rate was 5° C./min or more. When the cooling rate was less than 5° C./min, the gradient of tensile strength changed. Thus, the smaller the cooling rate is, the smaller is the tensile strength. The rolled sheet exhibited an elongation at break of from 5% to 15% under all the conditions. However, when the cooling rate was 5° C./min or more, the scattering of elongation at break was small. On the other hand, in the case where the cooling retention temperature was 20° C., no region was found where the tensile strength increases regardless of cooling rate, and the tensile strength was generally small.

While the present examination was effected with air cooling, the same tendency was found with an examination which had been effected with water cooling at the same time. The rolled sheet which had been examined with air cooling showed clean surface conditions while the rolled sheet which had been examined with water cooling was observed having an oxide formed on the surface thereof.

The higher the strength of the grid for a lead storage battery is, the more favorable is the lead storage battery. It was thus found from the foregoing results that the cooling rate of rolled lead alloy sheet is preferably 5° C./min or more and the cooling retention temperature is preferably 10° C. or lower.

While the present examination was effected on a coiled rolled sheet, the form of the rolled sheet is not limited thereto. For example, even when the rolled sheet which had been rolled is directly cooled by a cooling apparatus mounted on the rolling mill at the sheet exit thereof, the same effect can be obtained.

EXAMPLE 5

The influence of the cooling retention time of a rolled sheet on the stability of the rolled sheet during machining to grid was studied. The test procedure will be given below.

Test procedure: rolling ends→cooled→kept cooled→expanded

Cooling method: air cooling (time between the termination of rolling and the beginning of cooling is 2 hours or less)
Cooling time (until the cooling retention temperature is reached): 2 minutes (cooling rate: 30° C./min)
Cooling retention temperature: 0° C.
Cooling retention time: 0.1 to 100 hours As the rolled sheet there was used the same material as used in Example 1. For the production of grid, a rotary expander was used. The number of breaks on the frame in the grid per unit length was then examined to give an index of stability (The more the number of breaks is, the lower is the stability).

Figure 2:
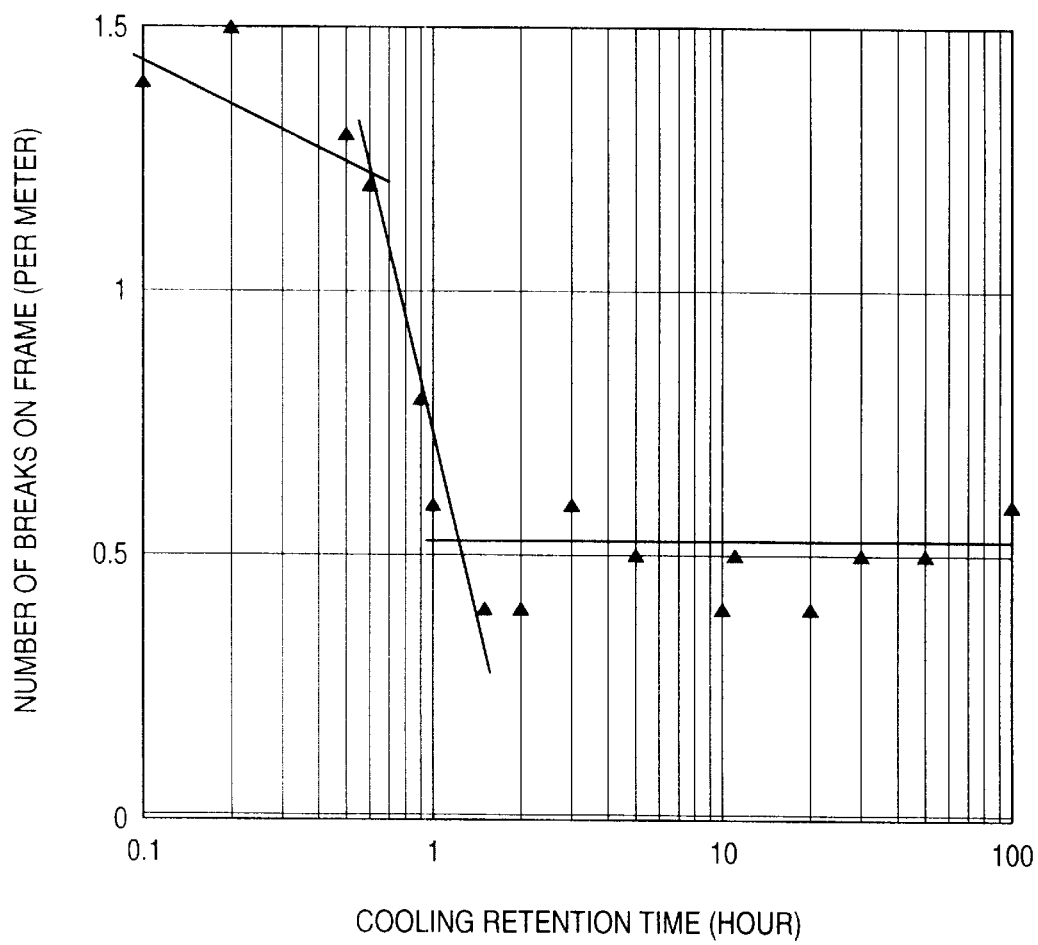
FIG. 2 shows a result of examination in Example 5.

The results of test are shown in FIG. 2. The number of breaks increased in the region where the cooling retention time is about 1 hour or less as compared with in the region where the cooling retention time is 1 hour or more. Further, in the region where the cooling retention time is 1 hour or more, the number of breaks remained almost the same with time.

The reason why the stability during machining is improved when the cooling retention time is not less than the predetermined value is unknown. It has heretofore been thought that cooling acts only to retard hardening. Judging from the phenomenon, however, it is thought that cooling has an effect which should be called cooling rather than hardening retarding effect. Though being a hypothesis, it is thought that since lead has a low recrystallization temperature even in the cold state, remarkably fine deposits are produced when kept at the cooling temperature as compared with ordinary temperatures, making it possible to obtain a rolled sheet having a high mechanical strength and an excellent stability during machining.

As mentioned in detail above, the present invention provides a method for producing a grid having an excellent life capable of minimizing recrystallization due to strain during machining to inhibit the deformation of grid. In addition, the break of a rolled sheet during machining can be inhibited.

What is claimed is:

1. A method for producing a grid for a lead storage battery comprising:
  a first step of sequentially rolling lead alloy over a plurality of rolls;
  a second step of machining the rolled sheet obtained at the first step to produce a grid for a lead storage battery; and
  between the first step and the second step, a cooling step of cooling the rolled sheet so that (1) the surface temperature thereof is 10° C. or lower at least once and (2) the total time during which the rolled sheet is exposed to an atmosphere of higher than 10° C. is 10 hours or less.

2. The method for producing a grid for a lead storage battery according to claim 1, wherein the cooling step is effected in a gas phase after the termination of said first step.

3. The method for producing a grid for a lead storage battery according to claim 2, wherein the cooling step is effected in such a manner that the surface temperature of the rolled sheet lowers to 10° C. or lower at a rate of 5° C./min or more.

4. The method for producing a grid for a lead storage battery according to claim 1, wherein said lead alloy is a lead-calcium-tin alloy comprising calcium and tin in an amount of from not less than 0.04% by mass to not more than 0.09% by mass and from not less than 1.0% by mass to not more than 2.4% by mass, respectively.

* * * * *